United States Patent [19]

Tsuruta et al.

[11] 4,093,505
[45] June 6, 1978

[54] METHOD AND APPARATUS FOR HEATING AND REMOVING MOISTURE FROM WATERY MATERIAL

[75] Inventors: Hidemasa Tsuruta, Tokyo; Shoji Itoh, Chiba; Masayuki Otsuka; Naoki Shimizu, both of Tokyo, all of Japan

[73] Assignee: Nittetu Chemical Engineering Ltd., Tokyo, Japan

[21] Appl. No.: 674,160

[22] Filed: Apr. 6, 1976

[30] Foreign Application Priority Data

Oct. 4, 1975 Japan .................................. 50-119371

[51] Int. Cl.² .............................................. B01D 1/22
[52] U.S. Cl. ...................................... 159/9 A; 34/136; 159/49
[58] Field of Search ................ 159/9 A, 11 A, 8; 34/135, 136, 137, 109; 259/3, 14, 30, 57, 89; 241/48, 54, 70, 71, 72, 183; 432/105, 114, 197

[56] References Cited

U.S. PATENT DOCUMENTS

| | | | |
|---|---|---|---|
| 1,057,247 | 3/1913 | Lierfeld | 259/89 |
| 1,460,008 | 6/1923 | Willis | 241/183 |
| 1,587,769 | 6/1926 | Fisher | 241/72 |
| 2,275,117 | 3/1942 | Vogel-Jorgensen | 159/8 |

FOREIGN PATENT DOCUMENTS

| | | | |
|---|---|---|---|
| 329,915 | 8/1903 | France | 241/54 |
| 326,137 | 5/1935 | Italy | 241/48 |

*Primary Examiner*—Norman Yudkoff
*Attorney, Agent, or Firm*—Lane, Aitken, Dunner & Ziems

[57] ABSTRACT

Method and apparatus for heating and removing moisture from moist or watery material, wherein a watery material is introduced into one end of a rotating cylindrical drum having a section divided into a number of longitudinally extending compartments including a center compartment and circumferential compartments surrounding the center compartment and each accommodating freely disposed packing members. A hot gas is blown axially through the drum while the packing members in the respective compartments are caused to tumble in contact with the watery material to transfer the sensible heat of the hot gas thereto.

10 Claims, 5 Drawing Figures

METHOD AND APPARATUS FOR HEATING AND REMOVING MOISTURE FROM WATERY MATERIAL

SUMMARY OF THE INVENTION

This invention relates to a method and apparatus for evaporating and removing water from a solution, slurry, wet sludge or other moist or watery material by direct contact with a hot gas.

The instant invention is particularly effective in a system where indirect heating through a conventional heating surface would result in stagnation of the heated material at the surface, causing a considerable drop in the heat transfer coefficient, or where the heated material would become stagnant as a whole and block a flow passage due to thermal decomposition. The invention can find a wide range of applications with regard to the nature of the materials to be heated and their products to be handled. For instance, it becomes possible to concentrate a thick fermentative waste liquor to a state which has a certain degree of fluidity only upon heating (solidifying at room temperature or upon cooling). The invention can also be applied to the treatment of excess sludge which is discharged from an activated sludge process for treatment of waste water, for converting the moist sludge into dry powder.

Other possibilities include application to the combustive disposal of industrial waste waters. In such a case, the evaporative concentration of the waste water by an indirect-heating evaporator is stopped before the temperature reaches a level where solids precipitate the spoil the heating surface of the evaporator, continuedly heating the intermediate concentrate by the method or apparatus of the invention to convert it into a thick slurry or a solid form by further evaporative removal of moisture and then feeding the dried waste to a combustion furnace. This will enable less consumption of auxiliary fuel in the furnace or make it utterly unnecessary.

It is an object of the invention to provide a method for heating and removing water from a watery material, without stagnation of the heated material.

More particularly, it is an object of the invention to provide a method for heating and removing water from a watery material by means of a rotary drum which has a sectional area divided into a number of compartments each accommodating freely disposed filler means such that the filler members are caused to tumble and collide with each other incessantly by the rotation of the drum to preclude stagnation of the heated material and to insure uniform distribution of heat over the entire sectional area of the drum.

It is still another object of the invention to provide an apparatus for carrying out the objectives mentioned above.

According to the present invention, there is provided a method for heating and removing moisture from watery material, comprising introducing a watery material into one end of a rotating drum having a sectional area divided into a number of longitudinally extending compartments including a center compartment and circumferential compartments surrounding the center compartment and each accommodating a suitable number of freely disposed packing members; blowing a hot gas axially through the rotating drum from the inlet end; causing the packing members in the respective compartments to tumble and collide with each other in contact with the watery material to transfer the sensible heat of the hot gas to the watery material to facilitate evaporation of the water content thereof; and discharging the dewatered material and humid exhaust gas from the other end of the rotating drum.

According to the present invention, there is also provided an apparatus for carrying out the method given above, which comprises a rotatably supported drum of generally cylindrical shape having an inlet and an outlet at opposite ends and having a sectional area divided into a number of longitudinally extending compartments including a center compartment and circumferential compartments around the center compartment; a feeding duct extending to the inlet of the drum for feeding watery material thereto; an air heater provided at the inlet end of the drum to blow a hot gas axially through the drum; packing members accommodated in each one of the compartments for free movement therein in contact with the watery material by rotation of the drum to transfer the sensible heat of the hot gas to the watery material to urge evaporation of water content thereof; an inlet hood enclosing and connecting the inlet of the rotary drum to the outlet of the air heater; and an open-bottomed outlet hood enclosing the outlet of the rotary drum and having an exhaust gas outlet in the upper portion thereof in communication with an exhaust gas duct.

The above and other objects, features and advantages of the invention will become apparent from the following description of the invention and the appended claims, taken in conjunction with the accompanying drawings.

PARTICULAR DESCRIPTION OF THE INVENTION

Figure 1:
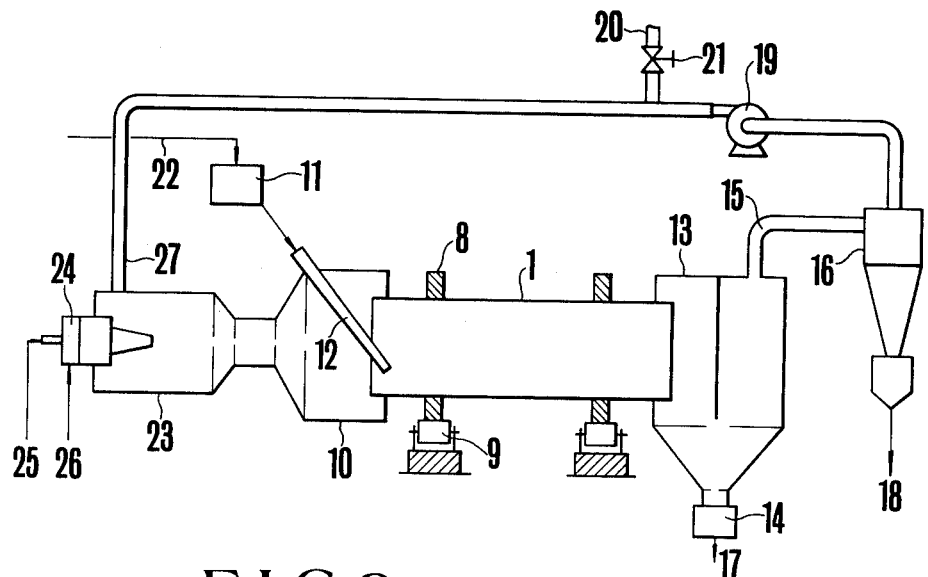
FIG. 1 is a diagrammatic view of an apparatus for carrying out the method of the invention.

Referring to FIG. 1, a moist material is fed continuously to one end of a cylindrical rotary drum 1 by a feeder 11 through a feeding pipe 12. A watery material such as a solution, slurry, paste or the like may be pumped into the drum, but it would be more convenient to use a conveyer to transfer a moist material like sludge. A suitable feeder should be selected in consideration of the nature of the material to be fed to the drum.

The rotary drum 1 has tires 8 fixed around its circumference and is rotatably mounted on support rolls 9. The rotary drum 1 is rotatingly driven from outside through a girth gear or the like. One end of the rotary drum 1 is covered with an inlet hood 10 to which a direct-flame type air heater 23 is connected to blow a hot gas into the drum 1. The air heater 23 is provided at one end with a burner 24 which receives fuel and air supplied through pipes 25 and 26, respectively. In order to maintain the hot gas from the air heat 23 at a predetermined temperature level, for instance, at 600° C, part of the exhaust gas is returned through a diluting gas duct 27 into the air heater 23 to mix with the combustion gas as will be described in greater detail.

The other end of the rotary drum 1 is covered with an outlet hood 13 where the exhaust gas which contains the moisture evaporated in the drum 1 is separated from the dewatered product and led through an exhaust duct 15 to a dust collector 16 for the removal of fine dust 18 and then to an exhaust blower 19. The suction of the blower 19 is adjusted so that the inner pressure of the rotary drum 1 is maintained at a level proximate to the atmosphere pressure, so that part of the discharged gas is returned to the aforementioned direct-flame type air heater while the remainder is discharged out of the system through a regulator valve 21 and an exhaust pipe 20. The dewatered product 17 is discharged out of the system by means of a discharger 14 of a suitable construction in view of the nature of the material to be handled, which may be in the form of a thick slurry or solid particles depending upon the purpose of treatment.

Figure 2:
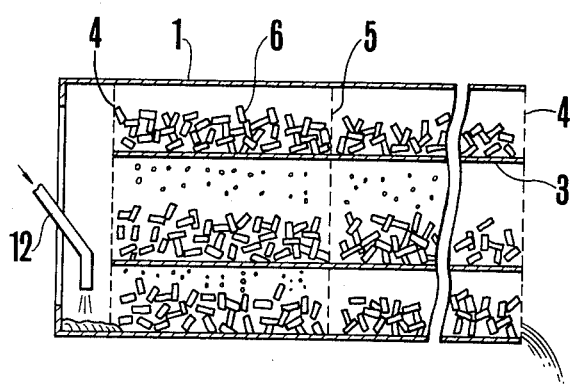
FIG. 2 is a fragmentary longitudinal cross-section of a rotary drum using metal rings as packing.
Figure 3:
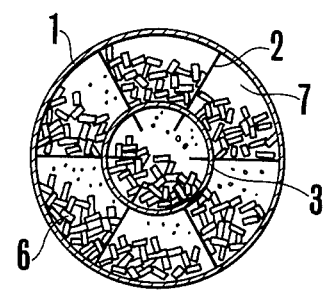
FIG. 3 is a transverse cross-section of the rotary drum of FIG. 2.

The heating and moisture evaporating mechanisms in the rotary drum 1 which play an important role in the present invention are illustrated in FIGS. 2 to 5. The interior of the rotary drum 1 is divided into a plural number of compartments 7 each receiving therein discrete metallic packing members 6 which serve to receive heat from the entering hot gas and transfer it to the charged moist material. The shape of the packings should also be determined in consideration of the nature of the charging material. FIGS. 2 and 3 show an example of a suitable type packing. In this instance, the packings 6 are obtained by cutting a metal pipe in lengths substantially equal to its diameter. It is recommended to use rings which are usually referred to as Raschig rings. In the particular embodiment shown, the compartments 7 include a centrally positioned cylindrical compartment and six sectoral compartments around the center compartment as seen in the transverse section in FIG. 3. Each one of the center and sectoral compartments is further divided axially into a number of longitudinal sections or subcompartments as seen in FIG. 2. The compartments and subcompartments are separated by partition walls 2 to 5 which are in the form of grids, wire mesh, porous plate or the like to allow passage therethrough of the charged material, combustion products and hot gas while blocking passage of the packings. Therefore, as soon as a raw liquid from the feed pipe 12 reaches the bottom of the rotary drum 1 in a given compartment, it is carried away upwardly with the packing members which keep tumbling in the compartment as the drum 1 rotates. In this manner, as the drum 1 makes one revolution, the packing members keep tumbling in the respective compartments with their surfaces contacting and sliding against surfaces of other packing members. The liquid scooped by and carried on the inner and outer surfaces of the packing members falls down as the compartment is moved to an upper position, onto the rings in lower compartments. While the hot gas is allowed to flow uniformly through the entire sectional area of the drum 1, its sensible heat is transferred to the inner and outer surfaces of the rings and at the same time to the liquid on those surfaces. As a result, the water content in the liquid is evaporated, while the thickened liquid on the packing members is prevented from localized overheating which would usually be caused by local stagnation, since the packing members are kept in incessant and vigorous tumbling movement. Therefore, even if the liquid becomes viscous or crystallizes, there is no possibility of the heated material stagnating on the ring surfaces or being decomposed by overheating to cause clogging.

As will be appreciated from the foregoing description, one of the important features of the invention resides in the tumbling movement of the packing members which encourage the effective contact between the hot gas and the liquid. It is recommended to employ metallic packing members from the standpoint of mechanical strength and thermal conductivity. Another feature of the invention is that the sectional area of the rotary drum is divided into a number of independent partitioned compartments each containing a suitable amount of discrete packing members. This rotary drum arrangement allows uniform heat transfer between the hot gas and the charged material substantially over the entire sectional area of the drum. In a simple hollow drum without such compartments, the packings would tend to stay always at the bottom of the drum letting the hot air pass thereover without exchanging heat. Thus, the heat transfer effect would be lowered considerably even if the same amount of packings were used in a hollow drum of the same size.

It will be seen that the provision of partitioned compartments in the rotary drum contributes to the improvement of the heat transfer effects and makes it possible to construct a large sized apparatus. With a larger drum, the number of compartments as seen in the transverse section should preferably be increased while subdividing each compartment axially as shown in FIG. 3. The heat transfer effects can be increased by shifting the phases of the axially aligned compartments to provide staggered paths for the hot gas.

Figure 4:
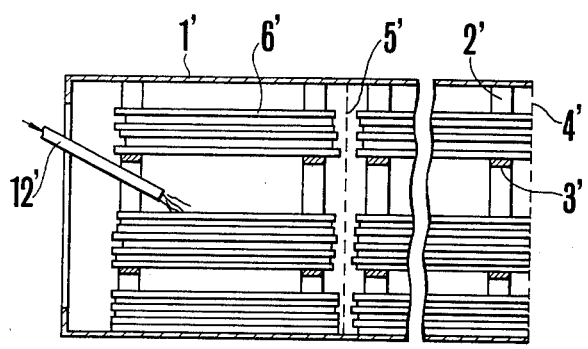
FIG. 4 is a fragmentary longitudinal cross-section of a rotary drum using metal pipes as packing.
Figure 5:
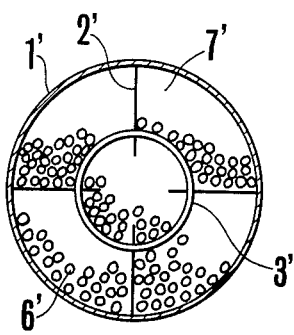
FIG. 5 is a transverse cross-section of the rotary drum of FIG. 4.

Depending upon the nature of the charging material or products to be handled, the interior arrangement of the drum 1 may be modified as shown in FIGS. 4 and 5. The modification of FIGS. 4 and 5 is adapted to dewater and dry excessive sludge which is discharged from an activated sludge process of waste water, recovering the sludge in a powdery form. As seen in these figures, metal pipes are employed as packing members instead of rings. The metal pipes have a length extending substantially over the full length of the respective compartments and have opposite ends closed to preclude invasion of charged material. The transverse section of the drum is divided into five compartments including the cylindrical center compartment, each one of the compartments receiving therein a suitable number of metal pipes which are retained in the respective compartment by partition plates 2', cylindrical wall of the center compartment 3', end lattice 4' and intermediate lattice 5'.

In the modification of FIGS. 4 and 5, the drum 1' is mounted in a slanting position, downwardly to the right end, and has no end lattice at the left-hand feeding end as there is no possibility of the metal pipes straying from the left end during the rotation of the drum 1. Moist sludge is charged through a feed pipe 12' into one of the compartments as shown in FIG. 4, and heated, stripped of moisture and dried while being crushed between the packing pipes. In this embodiment, the walls of the packing pipes act as heat conductors and the material depositing on the pipes is continuously removed therefrom, preventing stagnation and clogging of the charged material which would otherwise be caused by decomposition in overheated areas. The charged material is thus transferred by gravity through the spaces in or between the respective compartments with the aid of blasts of hot gas while undergoing heating, dewatering and drying in the same manner as previously described with reference to FIGS. 2 and 3. Description of these and other similar operating principles is omitted here to avoid unnecessary repetition.

EXAMPLE 1

A pilot concentrator/dryer was constructed, providing a rotary drum of the construction as shown in FIGS. 2 and 3 and having an inner diameter of 380 mm, a length of 770 mm and an inner volume of 86.7 liters. 20A steel pipes were cut into 30 mm wide rings and put in each compartment of the drum to occupy about 65% of the inner space thereof. Propane gas was burned and the resulting hot gas was passed, after dilution with air, axially through this apparatus, while a distillation waste liquor of alcoholic fermentation from blackstrap molasses was concentrated to about 35% by indirect heating and the concentrated liquid was fed through the feed pipe 12, obtaining the results as given below.

| Sample | Liquid Amounts (kg/h) | | Gas Temperature (° C) (Liquid Temperature) | | Balance or Evaporated Water (kg/h) | Liquid Concentration | | Evaporation Velocity (kgH$_2$O/M$^3$,h) |
|---|---|---|---|---|---|---|---|---|
| | At Inlet | At Outlet | At Inlet | At Outlet | | At Inlet | At Outlet | |
| 1 | 119.7 | 50.1 | 820 (26) | 150 (89) | 69.6 | 35.2 | 80.5 | 803 |
| 2 | 122.5 | 52.2 | 800 (27) | 160 (92) | 70.3 | 32.7 | 76.5 | 811 |

The evaporation velocity was defined in terms of evaporation per unit volume of empty rotary drum.

EXAMPLE 2

The same system as in Example 1 as used, except that the interior of the rotary drum was arranged as in FIGS. 4 and 5, subdividing each compartment axially into three longitudinal subcompartments. 20A steel pipes were cut into lengths of about 250 mm for use as packings. After closing the opposite ends of the packing pipes, they were placed in the respective compartments to occupy about 50% of the spaces thereof. A hot gas was produced and introduced into the system in the same manner as in the preceding example, while sewage sludge cakes from a municipal sewage disposing plant was fed into the system at a position corresponding to the feed pipe of FIG. 4, with the results as given below.

| Sample | Liquid Amounts (kg/h) | | Gas Temperature (° C) (Cake Temperature) | | Balance or Evaporated Water (kg/h) | Water Content (%) | | Drying velocity (kgH$_2$O/M$^3$,h) |
|---|---|---|---|---|---|---|---|---|
| | At Inlet | At Outlet | At Inlet | At Outlet | | At Inlet | At Outlet | |
| 1 | 58.2 | 31.3 | 580 (25) | 145 (85) | 26.9 | 48.3 | 3.5 | 310 |
| 2 | 61.8 | 34.1 | 610 (25) | 150 (86) | 27.7 | 48.0 | 5.2 | 319 |

In each test, the dried sludge was in a powdery form and could be easily removed from the outlet end of the drum. No clogging of the charged material occured in the compartments.

What is claimed is:

1. A method for heating and removing moisture from watery material, comprising:
    introducing a watery material into one end of a rotating drum having a sectional area divided by perforated partitions into a number of longitudinally extending compartments including a center compartment and circumferential compartments each accommodating and retaining loose packing members disposed to tumble freely within a given compartment;
    blowing hot air axially through said rotating drum from said one end; and
    discharging dewatered material and exhaust gas from the other end of the rotating drum.

2. The process of claim 1 wherein said perforated partitions include radial, longitudinally extending partitions and a central cylindrical partition defining said center compartment.

3. The process of claim 1 wherein the hot air is blow uniformly through the entire sectional area of the drum.

4. An apparatus for heating and removing moisture from watery material, comprising:
    a rotatably supported drum of cylindrical shape having an inlet and an outlet at opposite ends;
    a plurality of perforated partitions dividing said drum into a number of longitudinally extending compartments for accommodating packing elements including a center compartment and circumferential compartments around said center compartment each compartment retaining packing elements therein, said perforated partitions all allowing passage of the watery material while blocking passage of the packing elements;
    a feeding duct extending to said inlet of said drum for feeding watery material thereto;
    means for introducing a hot gas axially through said drum; and
    means for removing exhaust gas from said drum.

5. The apparatus of claim 4 wherein said perforated partitions include radial, longitudinally extending partitions and central cylindrical partition defining said center compartment.

6. The apparatus of claim 4 wherein said partition means is a grid, wire mesh or porous plate.

7. The apparatus of claim 4, wherein said compartments are subdivided axially into longitudinal subsections.

8. The apparatus of claim 4, wherein said means for removing the exhaust gas includes an exhaust duct, a dust collector for removing fine dust from said exhaust gas, a blower located downstream of said dust collector and having a suction suitable for maintaining the interior of said drum substantially at atmospheric pressure, and an exhaust return duct branched out downstream of said blower in communication with said means for introducing hot gas to return part of said exhaust gas to said drum as a diluting gas.

9. The apparatus of claim 4, further comprising Raschig rings as packing members.

10. The apparatus of claim 4, further comprising metal pipes as packing members extending substantially the full length of the respective compartments.

* * * * *